US011859786B2

(12) United States Patent
Song

(10) Patent No.: US 11,859,786 B2
(45) Date of Patent: Jan. 2, 2024

(54) VEHICLE LAMP USING SEMICONDUCTOR LIGHT-EMITTING DEVICE

(71) Applicant: LG ELECTRONICS INC., Seoul (KR)

(72) Inventor: Hooyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/781,228

(22) PCT Filed: Feb. 10, 2020

(86) PCT No.: PCT/KR2020/001815
§ 371 (c)(1),
(2) Date: May 31, 2022

(87) PCT Pub. No.: WO2021/107272
PCT Pub. Date: Jun. 3, 2021

(65) Prior Publication Data

US 2023/0023206 A1 Jan. 26, 2023

(30) Foreign Application Priority Data

Nov. 28, 2019 (KR) ........................ 10-2019-0156077

(51) Int. Cl.
*F21S 41/143* (2018.01)
*F21S 41/25* (2018.01)
*F21S 41/151* (2018.01)

(52) U.S. Cl.
CPC ........... *F21S 41/143* (2018.01); *F21S 41/151* (2018.01); *F21S 41/25* (2018.01)

(58) Field of Classification Search
CPC ......... F21S 41/151; F21S 41/25; F21S 41/143
See application file for complete search history.

(56) References Cited

U.S. PATENT DOCUMENTS 10,514,143 B2 * 12/2019 Courcier ............... F21S 41/255
11,573,000 B2 * 2/2023 Sakurai .............. G02B 27/0933
(Continued)

FOREIGN PATENT DOCUMENTS

CN 109073189 12/2018
JP 2017201676 11/2017
(Continued)

OTHER PUBLICATIONS

Korean Intellectual Property Office Application Serial No. 10-2019-0156077, Office Action dated Mar. 23, 2021, 4 pages.
(Continued)

*Primary Examiner* — Christopher E Dunay
(74) *Attorney, Agent, or Firm* — LEE, HONG, DEGERMAN, KANG & WAIMEY

(57) ABSTRACT

The present invention relates to a vehicle lamp and, more particularly, to a vehicle lamp using a semiconductor light-emitting device. The present invention provides a vehicle lamp comprising: a substrate; first and second bar-shaped light sources arranged parallel to one side of the substrate and extending along one direction thereof; and a lens disposed on one surface of the substrate and extending along the one direction so as to overlap with the first and second light sources, wherein the cross-section of the lens, which is perpendicular to the extending directions of the two light sources and cut along a virtual plane perpendicular to the substrate, includes a part of an ellipse.

4 Claims, 14 Drawing Sheets

(56) References Cited

U.S. PATENT DOCUMENTS

| | | | | |
|---|---|---|---|---|
| 2005/0233485 | A1* | 10/2005 | Shishov | H01L 33/58 257/E33.059 |
| 2014/0151731 | A1 | 6/2014 | Tran | |
| 2016/0312960 | A1* | 10/2016 | McCanless | F21V 13/02 |
| 2016/0334074 | A1 | 11/2016 | Fukui et al. | |
| 2017/0314764 | A1 | 11/2017 | Kishikawa et al. | |
| 2019/0063694 | A1* | 2/2019 | Kang | G02B 19/0066 |
| 2022/0018503 | A1* | 1/2022 | Shen | F21S 41/26 |

FOREIGN PATENT DOCUMENTS

| | | |
|---|---|---|
| JP | 2019096409 | 6/2019 |
| KR | 100902908 | 6/2009 |
| KR | 1020170077407 | 7/2017 |
| KR | 101913503 | 12/2018 |
| TW | I662224 | 6/2019 |

OTHER PUBLICATIONS

Korean Intellectual Property Office Application Serial No. 10-2019-0156077, Notice of Allowance dated Sep. 27, 2021, 2 pages.
PCT International Application No. PCT/KR2020/001815, International Search Report dated Aug. 24, 2020, 4 pages.
European Patent Office Application Serial No. 20892686.5, Search Report dated Oct. 25, 2023, 7 pages.

* cited by examiner

VEHICLE LAMP USING SEMICONDUCTOR LIGHT-EMITTING DEVICE

CROSS-REFERENCE TO RELATED APPLICATIONS

This application is the National Stage filing under 35 U.S.C. 371 of International Application No. PCT/KR2020/001815, filed on Feb. 10, 2020, which claims the benefit of earlier filing date and right of priority to Korean Application No. 10-2019-0156077, filed on Nov. 28, 2019, the contents of which are all incorporated by reference herein in their entireties.

TECHNICAL FIELD

The present disclosure relates to a vehicle lamp, and more particularly, to a vehicle lamp using a semiconductor light-emitting device.

BACKGROUND ART

Referring to FIG. 1, in general, a vehicle 1 is provided with a lamp apparatus 100 for stably securing a driver's visibility or notifying other vehicles of a driving state of the vehicle 1 when ambient illumination is low while driving.

A vehicle lamp apparatus includes a head lamp provided at a front side of the vehicle and a rear lamp provided at a rear side of the vehicle. The head lamp is a lamp that illuminates the front to light up the front while driving at night. The rear lamp includes a brake light that is turned on when the driver operates a brake pedal, and a turn signal light indicating an advancing direction of the vehicle.

Referring to FIG. 2, a light source 10 using a semiconductor light-emitting device having good energy efficiency is being used in the vehicle lamp apparatus 100. Semiconductor light-emitting devices are being minimized in size to increase a degree of design freedom of the lamp as well as have economic efficiency due to a semi-permanent lifespan, but most of them are currently being manufactured in a package form. Light-emitting diodes (LEDs) themselves, which are not packages, are semiconductor light-emitting devices that convert a current into light, and are being developed as light sources for display images of electronic apparatuses including information communication equipment.

However, since vehicle lamps that have been developed so far use package type light-emitting diodes, they are not good in terms of mass production yield, they are very expensive, and there is a weak point in that a degree of flexibility is low.

Meanwhile, as a demand for intelligent lamps increases, lamps capable of emitting light of various colors from one light-emitting surface are being developed.

DISCLOSURE OF INVENTION

Technical Problem

An aspect of the present disclosure is to provide a structure capable of allowing an effect of a single optical structure to be applicable to a plurality of different types of light sources. More specifically, an aspect of the present disclosure is to provide a structure capable of implementing the same light pattern when light sources spaced apart from each other are respectively turned on.

Solution to Problem

In order to achieve the foregoing objectives, the present disclosure provides a vehicle lamp including a substrate, first and second bar-shaped light sources disposed in parallel on one surface of the substrate, and configured to extend in one direction, and a lens disposed on one surface of the substrate, and configured to extend along the one direction to overlap the first and second light sources, wherein a cross-section of the lens cut along an imaginary plane perpendicular to extension directions of the two light sources and perpendicular to the substrate includes a portion of an ellipse.

According to an embodiment, the cross-section of the lens cut along an imaginary plane perpendicular to extension directions of the two light sources and perpendicular to the substrate may include a shape in which a plurality of portions of an ellipse overlap each other.

According to an embodiment, the cross-section of the lens cut along an imaginary plane perpendicular to extension directions of the two light sources and perpendicular to the substrate may include a first elliptical portion defined in a shape of a portion of the ellipse, and a second elliptical portion configured to overlap the first elliptical portion, and defined in a shape of a portion of the ellipse, wherein the second light source is disposed at a focal point of the first elliptical portion, and the first light source is disposed at a focal point of the second elliptical portion.

According to an embodiment, an angle defined by a major axis of each of the first and second elliptical portions and the substrate may be a half of a beam angle of either one of the first and second light sources.

According to an embodiment, the angle defined by a major axis of each of the first and second elliptical portions and the substrate may be 50 to 60 degrees.

According to an embodiment, the present disclosure may further include a fixing portion extending from each of the first and second elliptical portions to be in contact with the substrate.

According to an embodiment, the present disclosure may further include a protruding portion protruding in a direction toward which one surface of the substrate faces, between the first and second elliptical portions.

Advantageous Effects of Invention

According to the present disclosure, when light sources spaced apart from each other are respectively turned on, the same light pattern may be implemented.

BRIEF DESCRIPTION OF DRAWINGS

FIG. 7 is a conceptual view showing a light pattern when any one of light sources included in the lamp illustrated in FIG. 5 is turned on.

FIG. 10 is a conceptual view showing a light pattern when any one of light sources included in the lamp illustrated in FIG. 8 is turned on.

FIG. 14 is a conceptual view showing a light pattern when any one of light sources included in the lamp illustrated in FIG. 11 is turned on.

MODE FOR THE INVENTION

Figure 1:
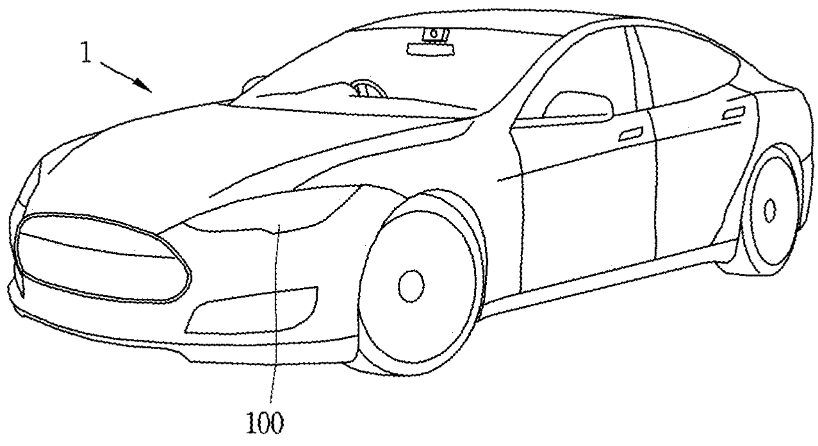
FIG. 1 is a conceptual view showing a vehicle.
Figure 2:
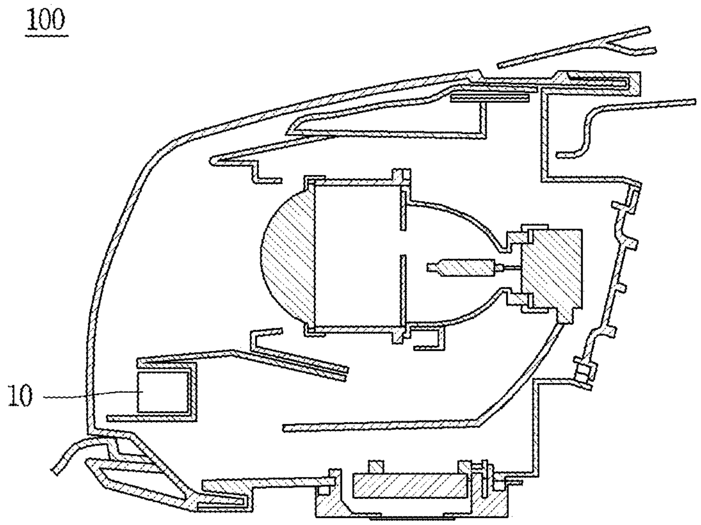
FIG. 2 is a cross-sectional view of a lamp apparatus included in a vehicle.

Hereinafter, the embodiments disclosed herein will be described in detail with reference to the accompanying drawings, and the same or similar elements are designated with the same numeral references regardless of the numerals in the drawings and their redundant description will be omitted. In describing an embodiment disclosed herein, moreover, the detailed description will be omitted when specific description for publicly known technologies to which the invention pertains is judged to obscure the gist of the present disclosure. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

The terms including an ordinal number such as first, second, etc. can be used to describe various elements, but the elements should not be limited by those terms. The terms are used merely for the purpose to distinguish an element from the other element.

A singular representation may include a plural representation unless it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

A vehicle lamp according to the present disclosure reflects or refracts light emitted from a light-emitting device at least once to emit the light to the outside. When light is reflected or refracted, a separate optical structure is disposed, which complicates a structure of the lamp and increases a size of the lamp.

A reflection or refraction effect of the optical structure may vary according to a relative position between the optical structure and a light source. Accordingly, positions at which the light source can be disposed based on a specific optical structure are limited. When a plurality of light sources are spaced apart from each other by a predetermined distance or more, it is difficult for at least one of the plurality of light sources to be affected by the effect of the specific optical structure.

For this reason, as the number of types of light sources included in a single lamp increases, an optical structure required for the lamp may increase. For example, when a single lamp is implemented to selectively emit red light and blue light, the single lamp must include both a structure for reflecting or refracting the red light and a structure for reflecting or refracting the blue light.

The present disclosure provides a structure capable of allowing an effect of a single optical structure to be applicable to a plurality of different types of light sources. More specifically, the present disclosure provides a structure capable of implementing the same light pattern when light sources spaced apart from each other are respectively turned on.

To this end, the present disclosure includes a substrate 510, first and second light sources **520*a* and 520*b*, and a lens 530**. Hereinafter, the foregoing elements will be described in detail.

The substrate 510, which is a base layer on which a structure is formed through an entire process, may be a wiring substrate on which a wiring electrode for applying power to a light source is disposed. Furthermore, the substrate may be made of glass, polyimide (PI), or a thin metal. In addition, as far as it is an insulating and flexible material, any one such as polyethylene naphthalate (PEN), polyethylene terephthalate (PET) or the like may be used. Furthermore, the substrate 510 may be either one of transparent and non-transparent materials.

Meanwhile, a heat dissipation sheet, a heat sink, or the like may be mounted on the substrate 510 to implement a heat dissipation function. In this case, the heat dissipation sheet or the heat sink may be mounted on a surface opposite to a surface on which the wiring electrode is disposed.

The first and second light sources and the lens are disposed on one surface of the substrate 510. The first and second light sources **520*a* and 520*b*** may include a plurality of semiconductor light-emitting devices.

The semiconductor light-emitting device has excellent luminance, and thus may be used as a light source of a vehicle lamp. A size of an individual semiconductor light-emitting device 150 may have a side length of 80 μm or less, and may be a rectangular or square device. In this case, an area of a single semiconductor light-emitting device may have a range of $10^{-10}$~$10^{-5}$ $m^2$, and a distance between the light-emitting devices may have a range of 100 μm to 10 mm.

Figure 3:
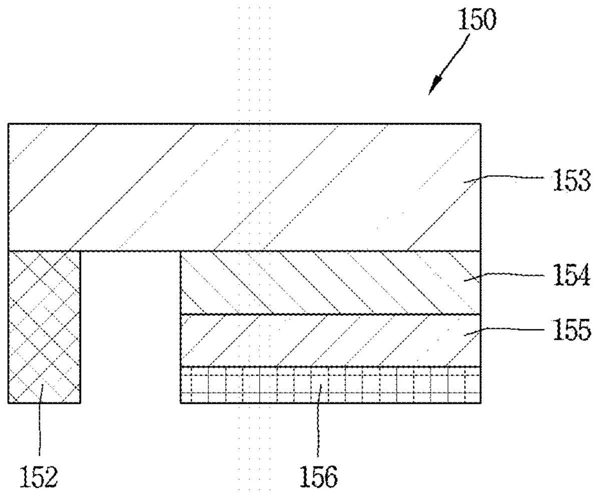
FIG. 3 is a cross-sectional view of a flip-chip semiconductor light-emitting device.

Referring to FIG. 3, the semiconductor light-emitting device may be a flip-chip type light-emitting device. For example, the semiconductor light-emitting device may include a p-type electrode 156, a p-type semiconductor layer 155 formed with the p-type electrode 156, an active layer 154 formed on the p-type semiconductor layer 155, an n-type semiconductor layer 153 formed on the active layer 154, and an n-type electrode 152 disposed to be separated from the p-type electrode 156 in a horizontal direction on the n-type semiconductor layer 153. In this case, the p-type electrode 156 may be electrically connected to an auxiliary electrode 170, and the n-type electrode 152 may be electrically connected to a second electrode 140.

Figure 4:
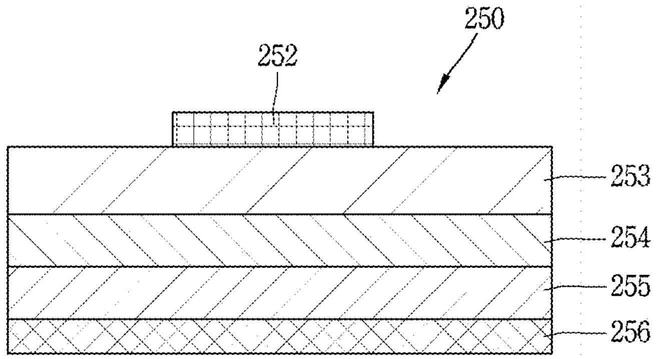
FIG. 4 is a cross-sectional view of a vertical semiconductor light-emitting device.

Referring to FIG. 4, such a vertical semiconductor light-emitting device 250 includes a p-type electrode 256, a p-type semiconductor layer 255 formed on the p-type electrode 256, an active layer 254 formed on the p-type semiconductor layer 255, an n-type semiconductor layer 253 formed on the active layer 254, and an n-type electrode 252 formed on the n-type semiconductor layer 253. In this case, the p-type electrode 256 located at the bottom thereof may be electrically connected to the first electrode 220 by the conductive adhesive layer 230, and the n-type electrode 252 located at the top thereof may be electrically connected to the second electrode 240 which will be described later. The electrodes may be disposed in a top-down direction in the vertical semiconductor light-emitting device 250, thereby providing a great advantage capable of reducing a chip size.

Each of the first and second light sources 520*a* and 520*b* includes a plurality of semiconductor light-emitting devices arranged in a line. Accordingly, when the semiconductor light-emitting devices provided in each of the first and second light sources 520*a* and 520*b* are turned on, a bar shape extending in one direction is displayed. In the present specification, a direction in which a plurality of semiconductor light-emitting devices are arranged in a line is defined as an extension direction of the light source. Meanwhile, even though the first and second light sources 520*a* and 520*b* each have a bar shape, it does not mean that the plurality of semiconductor light-emitting devices are disposed without a separation distance. The semiconductor light-emitting devices provided in the light source may be disposed to be spaced apart from each other by a predetermined distance, and when all of the semiconductor light-emitting devices provided in the light source are turned on and displayed in a bar shape, the light source is referred to as a bar-shaped light source.

The first and second light sources 520*a* and 520*b* are respectively disposed on one surface of the substrate, and disposed in parallel to each other. The wiring electrode formed on the substrate is implemented such that the first and second light sources 520*a* and 520*b* can be individually turned on.

Meanwhile, the lens 530 is disposed on one surface of the substrate 510 to overlap the first and second light sources 520*a* and 520*b*. The lens 530 does not need to be in contact with the first and second light sources 520*a* and 520*b*, and an air gap may be disposed between the lens 530 and the first and second light sources 520*a* and 520*b*.

A shape of the lens 530 may be implemented in various ways, but with a structure of the lens in the related art, when two light sources spaced apart from each other are respectively turned on, the same light pattern cannot be implemented. Prior to describing a structure of the lens according to the present disclosure, a light pattern will be described when a lens in the related art is disposed on the first and second light sources.

Figure 5:
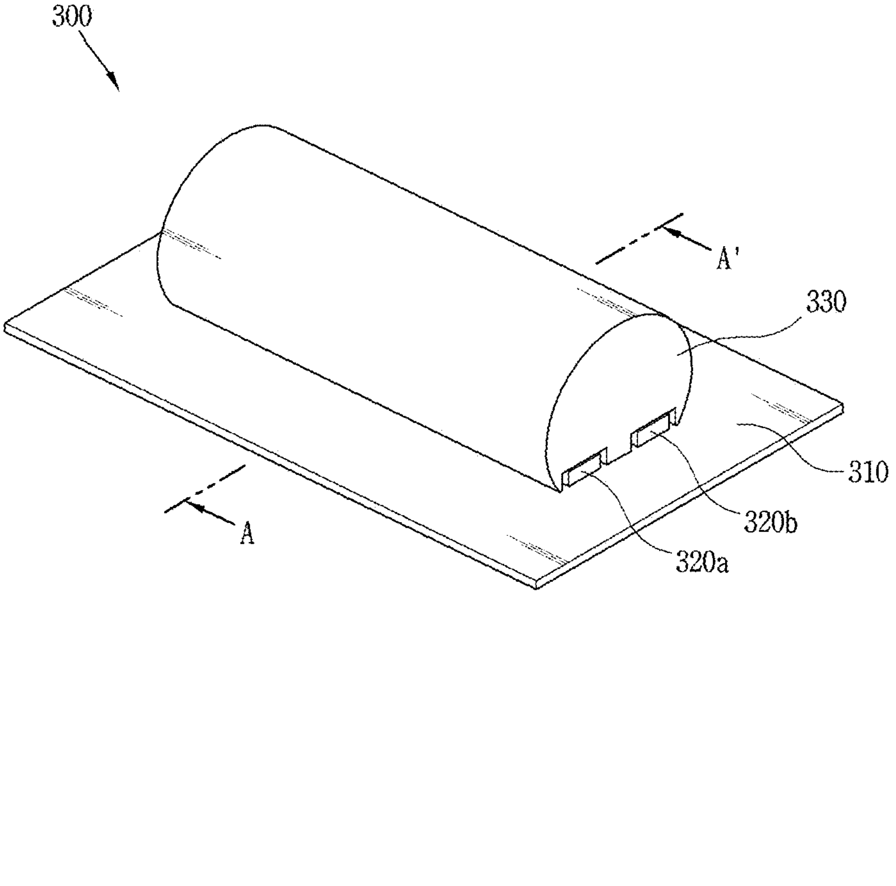
FIG. 5 is a conceptual view showing a lamp including a lens having a circular pattern.
Figure 6:
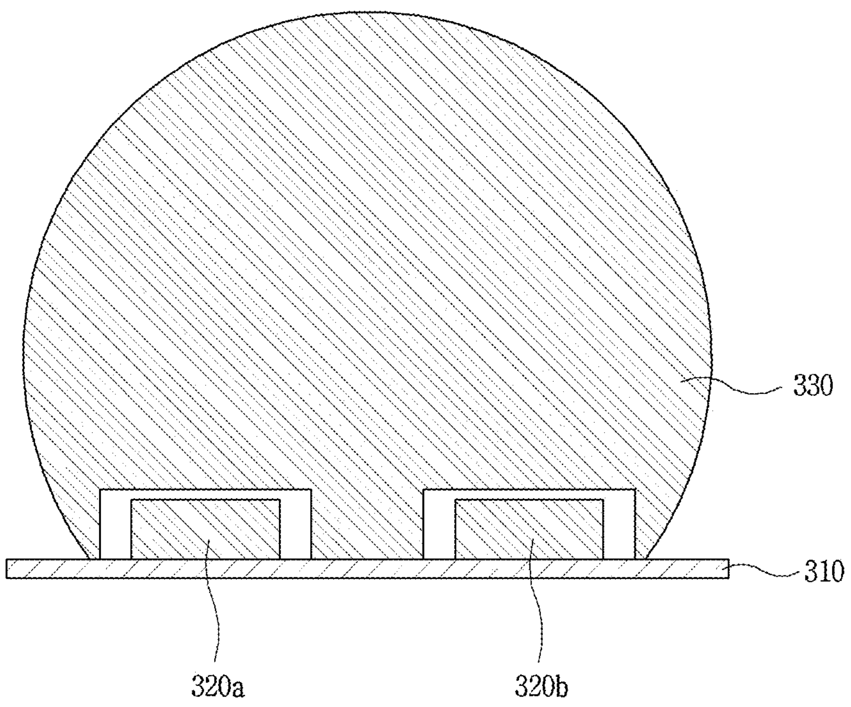
FIG. 6 is a cross-sectional view of a lamp illustrated in FIG. 5.
Figure 7:
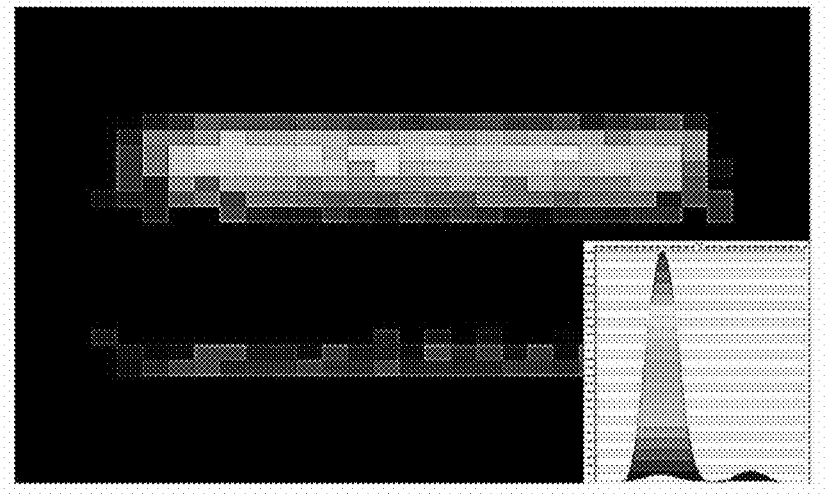

FIG. 5 is a conceptual view showing a lamp including a lens having a circular pattern, FIG. 6 is a cross-sectional view of a lamp illustrated in FIG. 5, and FIG. 7 is a conceptual view showing a light pattern when any one of light sources included in the lamp illustrated in FIG. 5 is turned on.

Referring to FIG. 5, a cylindrical lens has been used in the related art. When the lamp shown in FIG. 5 is cut along an imaginary plane (refer to line A-A') perpendicular to extension directions of the two light sources and perpendicular to the substrate, a cross-section of the lamp is shown in FIG. 6.

Referring to FIG. 6, the lens 330 surrounding the two light sources 320*a* and 320*b* includes a portion of a circular shape. According to the structure of the lens 330 illustrated in FIGS. 5 and 6, a different light pattern is implemented whenever light sources spaced apart from each other are respectively turned on.

For example, when either one of the light sources 320*a* and 320*b* included in a lamp 300 according to FIGS. 5 and 6 is turned on, a light pattern shown in FIG. 7 is implemented. Specifically, a light pattern is formed to be bright at a position adjacent to a light source that is turned on, and a light pattern is formed to be dark at a position adjacent to a light source that is not turned on.

When a light source different from the turned-on light source is turned on, a light pattern in which the light pattern shown in FIG. 7 is inverted is formed. That is, the lamp according to FIGS. 5 and 6 cannot implement the same light pattern when two light sources spaced apart from each other are respectively turned on.

Figure 8:
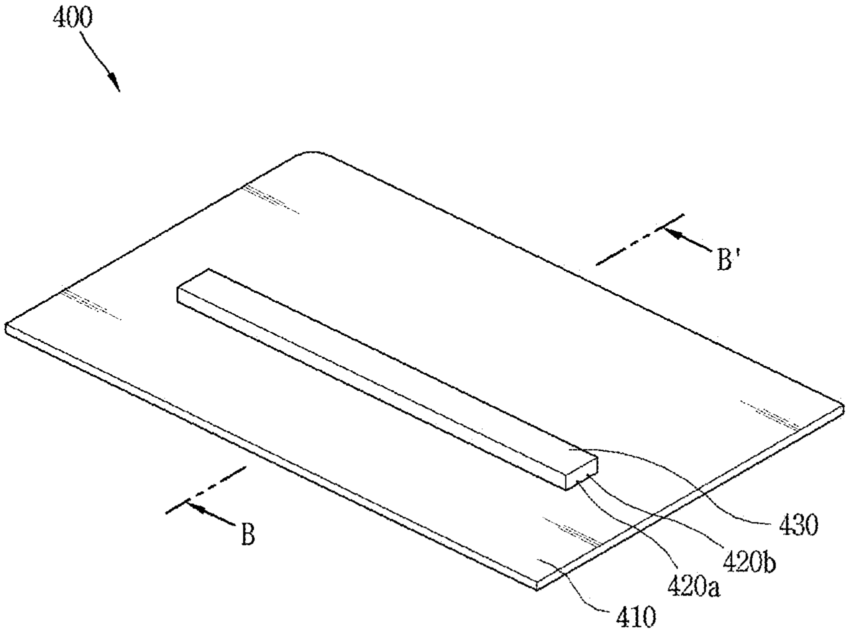
FIG. 8 is a conceptual view showing a lamp including a lens having a circular pattern.
Figure 9:
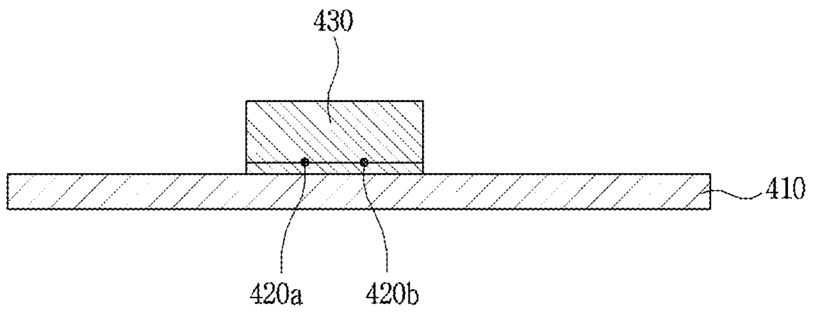
FIG. 9 is a cross-sectional view of a lamp illustrated in FIG. 8.
Figure 10:
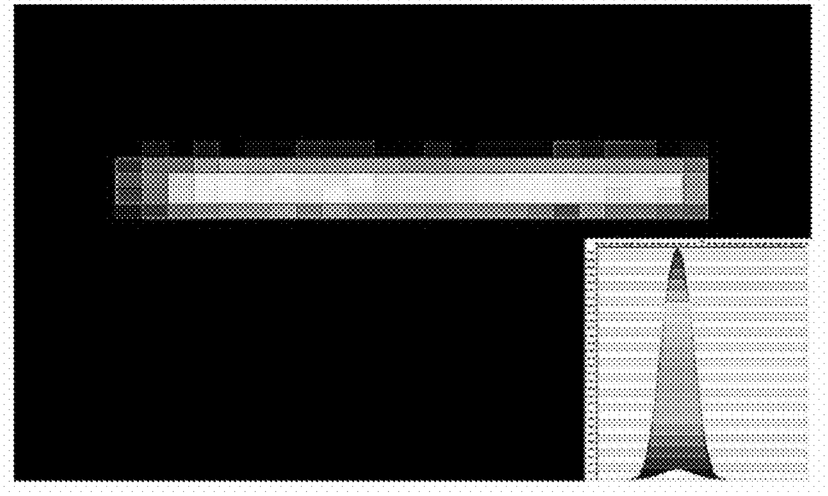

FIG. 8 is a conceptual view showing a lamp including a lens having a circular pattern, FIG. 9 is a cross-sectional view of a lamp illustrated in FIG. 8, and FIG. 10 is a conceptual view showing a light pattern when any one of light sources included in the lamp illustrated in FIG. 8 is turned on.

Referring to FIG. 8, a cuboid-shaped lens 430 has been used in the related art. When a lamp 400 illustrated in FIG. 8 is cut along an imaginary plane (refer to line B-B') perpendicular to extension directions of the two light sources 420*a* and 420*b* and perpendicular to the substrate 410, a cross-section of the lamp 400 is shown in FIG. 9.

Referring to FIG. 9, the lens 430 surrounding the two light sources 420*a* and 420*b* has a rectangular shape. According to a structure of the lens 430 illustrated in FIGS. 8 and 9, a different light pattern is implemented whenever the light sources 420*a* and 420*b* spaced apart from each other are respectively turned on.

For example, when either one of the light sources 420*a* and 420*b* included in a lamp according to FIGS. 8 and 9 is turned on, a light pattern shown in FIG. 10 is implemented. Specifically, a light pattern is formed to be bright at a position adjacent to a light source that is turned on, but the light pattern is not formed at a position adjacent to a light source that is not turned on.

When a light source different from the turned-on light source is turned on, a light pattern in which the light pattern shown in FIG. 10 is inverted is formed. That is, the lamp according to FIGS. 8 and 9 cannot implement the same light pattern when two light sources spaced apart from each other are respectively turned on.

Hereinafter, a structure of the lens 530 according to the present disclosure will be described.

Figure 11:
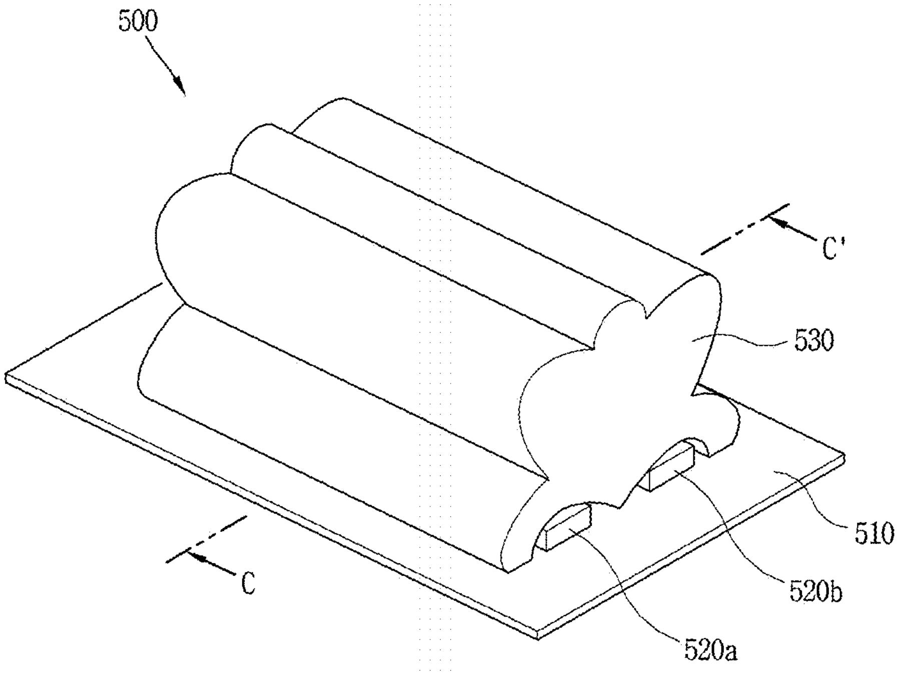
FIG. 11 is a conceptual view showing a lamp according to the present disclosure.
Figure 12:
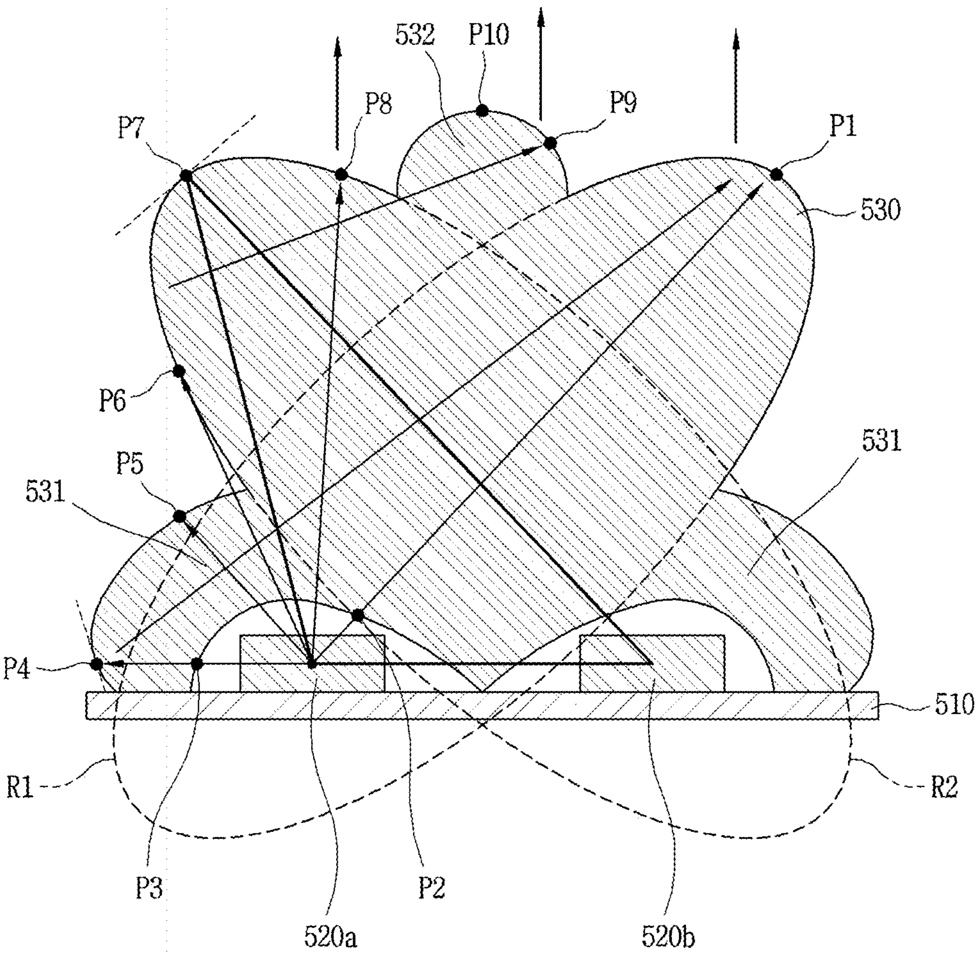
FIG. 12 is a cross-sectional view of a lamp illustrated in FIG. 11.
Figure 13:
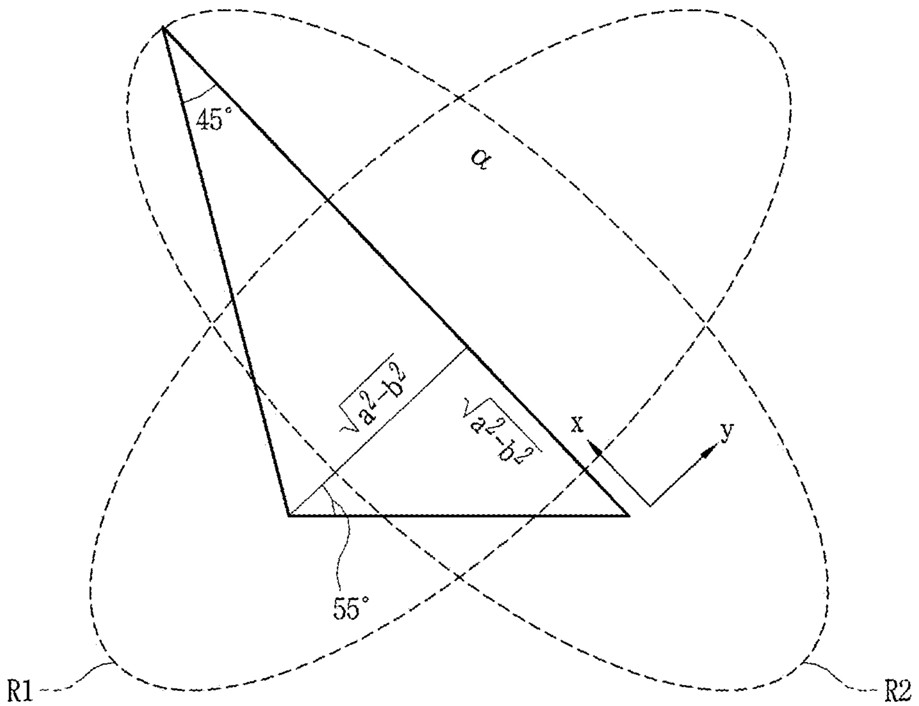
FIG. 13 is a conceptual view showing an embodiment in which two elliptical portions are disposed.
Figure 14:
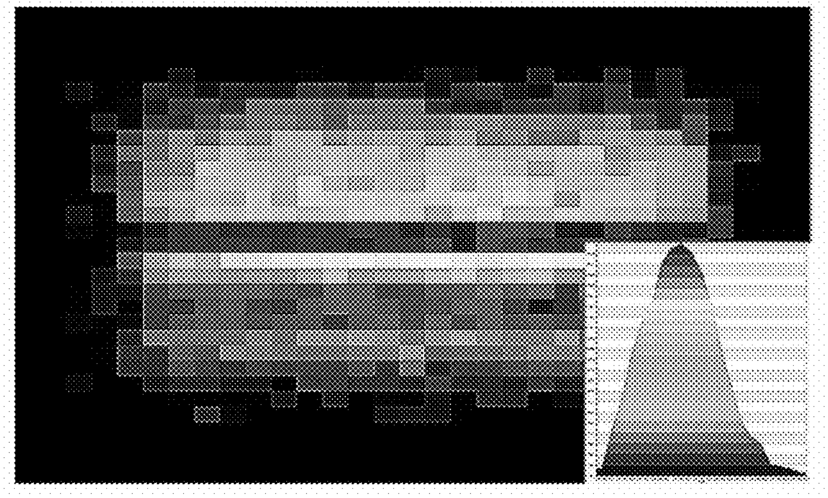

FIG. 11 is a conceptual view showing a lamp according to the present disclosure, FIG. 12 is a cross-sectional view of a lamp illustrated in FIG. 11, FIG. 13 is a conceptual view showing an embodiment in which two elliptical portions are disposed, and FIG. 14 is a conceptual view showing a light pattern when any one of light sources included in the lamp illustrated in FIG. 11 is turned on.

Referring to FIG. 11, the lens 530 according to the present disclosure is disposed to extend along a direction in which the first and second light sources 520*a* and 520*b* extend so as to overlap the first and second bar-shaped light sources 520*a* and 520*b*.

When a lamp illustrated in FIG. 11 is cut along an imaginary plane (refer to line C-C') perpendicular to extension directions of the two light sources 520*a* and 520*b* and perpendicular to the substrate 510, a cross-section of the lamp 500 is shown in FIG. 12. Hereinafter, a structure of the lens according to the present disclosure will be described with reference to FIG. 12.

A cross-section of the lens 530 cut along an imaginary plane perpendicular to the extension directions of the two light sources 520*a* and 520*b* and perpendicular to the substrate 510 includes a portion of an ellipse. Specifically, the cross-section of the lens includes a shape in which a plurality of portions of an ellipse overlap each other. In an embodiment, the cross-section of the lens includes a first elliptical portion R1 defined in a shape of a portion the ellipse, and a second elliptical portion R2 configured to overlap the first elliptical portion R1, and defined in a shape of a portion of the ellipse.

The second light source 520*b* is disposed at a focal point of the first elliptical portion R1. Preferably, the center of the second light source 520*b* may be disposed at the focal point of the first elliptical portion R1. Meanwhile, the first light source 520*a* may be disposed at a focal point of the second elliptical portion R2. Preferably, the center of the first light source 520*a* may be disposed at the focal point of the second elliptical portion R2.

Here, a focal point of the elliptical portion denotes either one of two focal points included in a virtual ellipse when the virtual ellipse including an edge of the elliptical portion is drawn. That is, even when the elliptical portion is not a perfect ellipse, a focus of the elliptical portion may exist. Meanwhile, a major axis, a minor axis, and a focal point of the elliptical portion to be described below are all based on a virtual ellipse including an edge of the elliptical portion.

An angle defined by a major axis of each of the first and second elliptical portions R1 and R2 and an imaginary axis perpendicular to the substrate 510 is a half of a beam angle of either one of the first and second light sources 520*a* and 520*b*. Here, the beam angle denotes a value twice the angle until an output of the light source becomes 50% of the peak value (in a direction of a central axis of the light source). A major axis of each of the first and second elliptical portions R1 and R2 may be disposed in a direction in which the output of the first and second light sources 520*a* and 520*b* becomes 50% of the peak value. For example, an angle defined by a major axis of each of the first and second elliptical portions R1 and R2 and an imaginary axis perpendicular to the substrate may be 50 to 60 degrees. However, the angle defined by a major axis of each of the first and second elliptical portions R1 and R2 and an imaginary axis perpendicular to the substrate may vary depending on a refractive index of a material constituting the lens 530. In an embodiment, the lens may be made of PMMA.

In an embodiment, the first and second elliptical portions R1 and R2 are preferably disposed in a shape as shown in FIG. 13. Specifically, in FIG. 13, a is a length of a major axis of each of the first and second elliptical portions R1 and R2, and b is a length of a minor axis of each of the first and second elliptical portions R1 and R2.

When the first and second elliptical portions R1 and R2 are disposed as described above, light emitted from the first light source 520*a* and incident to a first point P1 where a major axis of the second elliptical portion R2 meets an edge of the second elliptical portion R2 is emitted in a direction perpendicular to the substrate 520.

Meanwhile, according to the present disclosure, an amount of light emitted to the outside through the first point P1 is similar to that emitted to the outside through a seventh point P7. Here, the seventh point P7 is a point where a major axis of the second elliptical portion R2 meets to an edge of the second elliptical portion R2. When the amount of light emitted to the first point P1 and the amount of light emitted to the seventh point P7 are similar to each other, a light pattern similar to that when the first light source 520*a* is turned on and when the second light source 520*b* is turned on may be implemented.

To this end, the lens 530 further includes a fixing portion 531 extending from each of the first and second elliptical portions R1 and R2 to be in contact with the substrate. The fixing portion 531 supports the first and second elliptical portions R1 and R2, fixes the first and second elliptical portions R1 and R2 onto the substrate 510, as well as reflects light traveling to a side surface of the light source. For example, while the first light source 520*a* is turned on, a fixing portion disposed adjacent to the first light source 520*a* totally reflects light traveling to a side surface of the first light source 520*a*. To this end, an angle between a tangent line in contact with the fourth point P4 and the substrate 510 is preferably smaller than a total reflection critical angle. For example, when the lens 530 is made of PMMA, the angle between the tangent line and the substrate is preferably 50 degrees or less. A portion of light reflected from the fixing portion 531 adjacent to the first light source 520*a* travels toward the first point P1 to increase an amount of light emitted to the outside through the first point P1.

Meanwhile, in order to minimize total reflection at the first point P1 and the seventh point P7, an inclination at the two points is preferably implemented to be less than or equal to the total reflection critical angle.

Meanwhile, an air gap may exist between the lens and the first and second light sources 520*a* and 520*b*. In this case, reflection occurring at an interface between the air gap and the lens 530 is preferably minimized. For example, reflectance at second and third points P2 and P3 is preferably minimized.

Meanwhile, an inclination at a fifth point P5 included in the fixing portion is preferably defined such that light emitted to the outside through the fifth point P5 is preferably emitted in a direction perpendicular to the substrate.

In addition, a curvature of the ellipse is preferably maintained at a sixth point P6 to induce total reflection. Meanwhile, an inclination at an eighth point P8 is preferably defined to emit light incident on the eighth point P8 to the outside as it is.

Meanwhile, in order to increase an amount of light emitted to a central portion of the lens 530, the present disclosure may further include a protruding portion protruding in a direction toward which one surface of the substrate 510 faces between the first and second elliptical portions R1 and R2. The protruding portion 532 is disposed such that light emitted to the outside through the protrusion 532 is emitted in a direction perpendicular to the substrate. A vertical distance between each of ninth and tenth points P9 and P10 defined on the protruding portion 532 and the substrate is preferably greater than a vertical distance between each of the first and seventh points P1 and P7 and the substrate.

As described above, the lens 530 according to the present disclosure allows the same light pattern to be formed even when either one of the first and second light sources 520*a* and 520*b* is turned on. Specifically, referring to FIG. 14, when the first light source 520*a* is turned on, it can be seen that light having a similar brightness is emitted from the first elliptical portion R1 and the second elliptical portion R2. Accordingly, even when the second light source 520*b* is turned on, a light pattern similar to that of FIG. 14 is generated.

As described above, according to the present disclosure, when light sources spaced apart from each other are respectively turned on, the same light pattern may be implemented.

It is obvious to those skilled in the art that the present disclosure can be embodied in other specific forms without departing from the concept and essential characteristics thereof.

In addition, the above detailed description should not be construed as restrictive in all aspects and should be considered as illustrative. The scope of the invention should be determined by reasonable interpretation of the appended claims and all changes that come within the equivalent scope of the invention are included in the scope of the invention.

The invention claimed is:

1. A vehicle lamp comprising:

a substrate;

first and second elongated light sources disposed in parallel on one side of the substrate, and configured to extend along a first direction with respect to the substrate; and a lens disposed on the one side of the substrate, and configured to extend along the first direction to cover three sides of the first and second elongated light sources, wherein a cross-section of the lens along an imaginary plane in a second direction and perpendicular to the first and second elongated light sources and the substrate comprises a portion of an ellipse, wherein the second direction is perpendicular to the first direction, wherein the cross-section of the lens has a shape in which a plurality of portions of an ellipse overlap each other, wherein the cross-section of the lens comprises:

a first elliptical portion defined in a shape of a portion of the ellipse; and a second elliptical portion defined in a shape of the portion of the ellipse, wherein the second elliptical portion is configured to overlap the first elliptical portion, wherein the second elongated light source is disposed at a focal point of the first elliptical portion and the first elongated light source is disposed at a focal point of the second elliptical portion, and wherein two angles defined between a major axis of each of the first and second elliptical portions and the substrate is each half of a beam angle of either one of the first or second elongated light sources.

2. The vehicle lamp of claim 1, wherein the two angles are between 50 to 60 degrees.

3. The vehicle lamp of claim 1, further comprising:

a fixing portion extending from each of the first and second elliptical portions to be in contact with the substrate.

4. The vehicle lamp of claim 1, further comprising:

a protruding portion protruding in a third direction such that the protruding portion extends vertically from the one side of the substrate, wherein the protruding portion is positioned between the first and second elliptical portions.

* * * * *